(12) United States Patent
Kardach et al.

(10) Patent No.: US 7,194,283 B2
(45) Date of Patent: Mar. 20, 2007

(54) METHOD AND APPARATUS FOR COMMUNICATION USING MULTIPLE COMMUNICATION PROTOCOLS

(75) Inventors: James P. Kardach, Saratoga, CA (US); Gordon Chinn, San Jose, CA (US); Randy Durrant, Colorado Springs, CO (US); Krishnan Rajamani, San Diego, CA (US); Robert L. Monroe, Colorado Springs, CO (US)

(73) Assignee: Intel Corporation, Santa Clara, CA (US)

(*) Notice: Subject to any disclaimer, the term of this patent is extended or adjusted under 35 U.S.C. 154(b) by 362 days.

(21) Appl. No.: 10/218,401

(22) Filed: Aug. 14, 2002

(65) Prior Publication Data

US 2004/0204031 A1    Oct. 14, 2004

(51) Int. Cl.
H04M 1/00    (2006.01)
H04B 1/00    (2006.01)

(52) U.S. Cl. .................................. 455/552; 375/130
(58) Field of Classification Search ............ 455/552; 375/130
See application file for complete search history.

(56) References Cited

U.S. PATENT DOCUMENTS

| | | |
|---|---|---|
| 6,326,926 B1 | 12/2001 | Shoobridge et al. |
| 6,590,928 B1 | 7/2003 | Haartsen |
| 6,697,415 B1* | 2/2004 | Mahany ................. 375/130 |
| 2001/0051530 A1 | 12/2001 | Shiotsu et al. |
| 2002/0061031 A1 | 5/2002 | Sugar et al. |
| 2002/0062385 A1 | 5/2002 | Dowling |
| 2002/0067696 A1 | 6/2002 | Ho |
| 2002/0136184 A1 | 9/2002 | Liang et al. |
| 2002/0167931 A1 | 11/2002 | Jang et al. |
| 2002/0191677 A1 | 12/2002 | Chen et al. |
| 2003/0026198 A1 | 2/2003 | Diepstraten et al. |

FOREIGN PATENT DOCUMENTS

| | | |
|---|---|---|
| EP | 1 052 867 | 11/2000 |
| EP | 1 220 499 | 7/2002 |
| WO | WO 96/38925 | 12/1996 |
| WO | WO 00/64107 | 10/2000 |

OTHER PUBLICATIONS

European Search Report dated Sep. 24, 2004.
International Preliminary Examination Report for PCT/US03/24343 dated Apr. 1, 2005.

* cited by examiner

*Primary Examiner*—William D. Cumming
(74) *Attorney, Agent, or Firm*—Marshall, Gerstein & Borun LLP (57) ABSTRACT

Methods and apparatus are disclosed for communicating via a radio channel to reduce radio frequency (RF) interference between transceiver systems within an electronic device.

31 Claims, 8 Drawing Sheets

METHOD AND APPARATUS FOR COMMUNICATION USING MULTIPLE COMMUNICATION PROTOCOLS

TECHNICAL FIELD

The invention relates generally to wireless communication systems, and, more particularly, to methods and apparatus for communicating via a radio channel.

BACKGROUND

Typically, standard local area network (LAN) protocols such as Ethernet provide access to network resources through wired, land line connections within a small geographic area (e.g., within an office building). However, until recently, LANs were limited to the conventional wired network connections. To increase mobility and flexibility, the concept of wireless LANs (i.e., WLANs) have been introduced. That is, WLANs provide convenient access to network resources for portable computers (e.g., a laptop computer) and handheld devices (e.g., a personal digital assistant (PDA)) both in and out of the office via an access point. In particular, the 802.11 communication protocol developed by the Institute of Electrical and Electronics Engineers (i.e., the IEEE 802.11 standard, IEEE std. 802.11-1997, published 1997) provides a standard for WLANs for wireless transmissions using spread spectrum radio frequency (RF) signals in the 2.4 gigahertz (GHz) Industrial, Scientific, and Medical (ISM) frequency band. The 802.11 communication protocol offers wireless transmission at rates of either one megabits per second (1 Mbps) or two megabits per second (2 Mbps) to access wired LANs. Based on the 802.11 communication protocol, the 802.11b communication protocol (i.e., IEEE 802.11b standard, IEEE std. 802.11b-1999, published 1999, which is also known as Wi-Fi or Wireless Ethernet) may extend the rate to 11 Mbps. The 802.11b communication protocol may also increase the RF coverage up to approximately 500 feet. Despite enhancing the ability of an electronic device to access a LAN (e.g., for web browsing and e-mail), the 802.11b communication protocol may not be optimal for establishing a wireless connection with devices in a wireless personal area network (WPAN) such as computers, cellular telephones, personal digital assistants (PDAs), and other peripherals such as a mouse. That is, a disadvantage of the 802.11b communication protocol is that a transceiver system (i.e., a radio system) operating in accordance with the 802.11b communication protocol may use an unnecessary amount of power to communicate with WPAN devices.

It is widely known that the Bluetooth communication protocol also uses short-range radio links to replace physical cables connecting between portable and/or fixed electronic devices. Like the 802.11b communication protocol, the Bluetooth communication protocol also operates in the unlicensed 2.4 gigahertz (GHz) ISM frequency band for short-range wireless connection between computers, cellular telephones, cordless telephones, PDAs, local area networks (LANs) and other peripherals such as a printer, a mouse, and a facsimile machine. In particular, the Bluetooth communication protocol may be used in wireless personal access networks (WPANs) because it requires less power than the 802.11b communication protocol. For example, a laptop notebook may be able to synchronize with a PDA, to transfer files with a desktop computer and/or another laptop notebook, to transmit or to receive a facsimile, and to initiate a print-out of a document. Thus, an advantage of the Bluetooth communication protocol is that the protocol is more robust to communicate with WPAN devices than the 802.11b communication protocol. However, a transceiver system operating in accordance with Bluetooth communication protocol may not be able to operate at sufficient power, range, and speed to access a LAN.

Accordingly, to provide short range ad-hoc connections between devices in WPANs and connections to WLANs, two transceiver systems operating in accordance with different communication protocols may be integrated into an electronic device. For example, a laptop notebook may include two transceiver systems with one transceiver system operating in accordance with the 802.11b communication protocol (i.e., 802.11b transceiver system) and the other transceiver system operating in accordance with the Bluetooth communication protocol (i.e., Bluetooth transceiver system). The 802.11b transceiver system uses a direct sequence spread spectrum (DSSS) modulation technique whereas the Bluetooth transceiver system uses a frequency hopping spread spectrum (FHSS) modulation technique. In particular, the DSSS modulation technique spreads data transmissions across 22 MHz segments of the entire available frequency band in a prearranged scheme. Within the 2.4 GHz frequency band, the 802.11b communication protocol defines 14 "center frequency channels" with channels 1 through 11 supported within the United States, and channels 12 through 14 supported outside the U.S. In particular, channel 1 at 2.412 GHz, channel 6 at 2.437 GHz, and channel 11 at 2.462 GHz being the more commonly used non-overlapping channels. Channels 1, 6, and 11 are spaced apart by 25 MHz. The 802.11b communication protocol may also be configured to provide six overlapping channels spaced 10 MHz apart. Typically, the DSSS modulation technique uses one channel and spreads data transmissions across a twenty-two megahertz band (i.e., a bandwidth of 22 MHz). Further, the 802.11 b transceiver system may encode data with a code known only to certain 802.11b transceiver systems so that data transmissions may not be as susceptible for intruders to intercept and decipher. With FHSS modulation technique, the Bluetooth transceiver system is synchronized to hop from channel to channel in a predetermined pseudorandom sequence known only to certain Bluetooth transceiver systems. The Bluetooth communication protocol includes up to 79 narrow channels with each channel having a one megahertz band (i.e., a bandwidth of 1 MHz in between 2.4 and 2.484 GHz). Typically, the FHSS modulation technique uses a majority of the channels and hops between the channels for data transmissions. As a result, the 802.11b transceiver system may be used for WLAN communication, and the Bluetooth transceiver system may be used for WPAN communication.

As noted above, however, both the 802.11b communication protocol and the Bluetooth communication protocol operate in the 2.4 GHz ISM frequency band. That is, the channels used by 802.11b transceiver system and the Bluetooth transceiver system may interference with each other. Thus, collision may occur when the 802.11b transceiver system and the Bluetooth transceiver system are communicating at the same time (e.g., the Bluetooth transceiver system may cause interference to the 802.11b transceiver system).

DESCRIPTION OF THE EXAMPLES

Although the methods and apparatus disclosed herein are particularly well suited for use with a laptop computer including a transceiver system operating in accordance with 802.11b communication protocol and a transceiver system operating in accordance with Bluetooth communication protocol, persons of ordinary skill in the art will readily appreciate that the teachings herein are in no way limited to the laptop computer. On the contrary, persons of ordinary skill in the art will readily appreciate that the teachings of the invention can be employed with any electronic device such as a cellular telephone and a personal digital assistant (PDA) regardless of the wireless communication protocols it employs.

Figure 1:
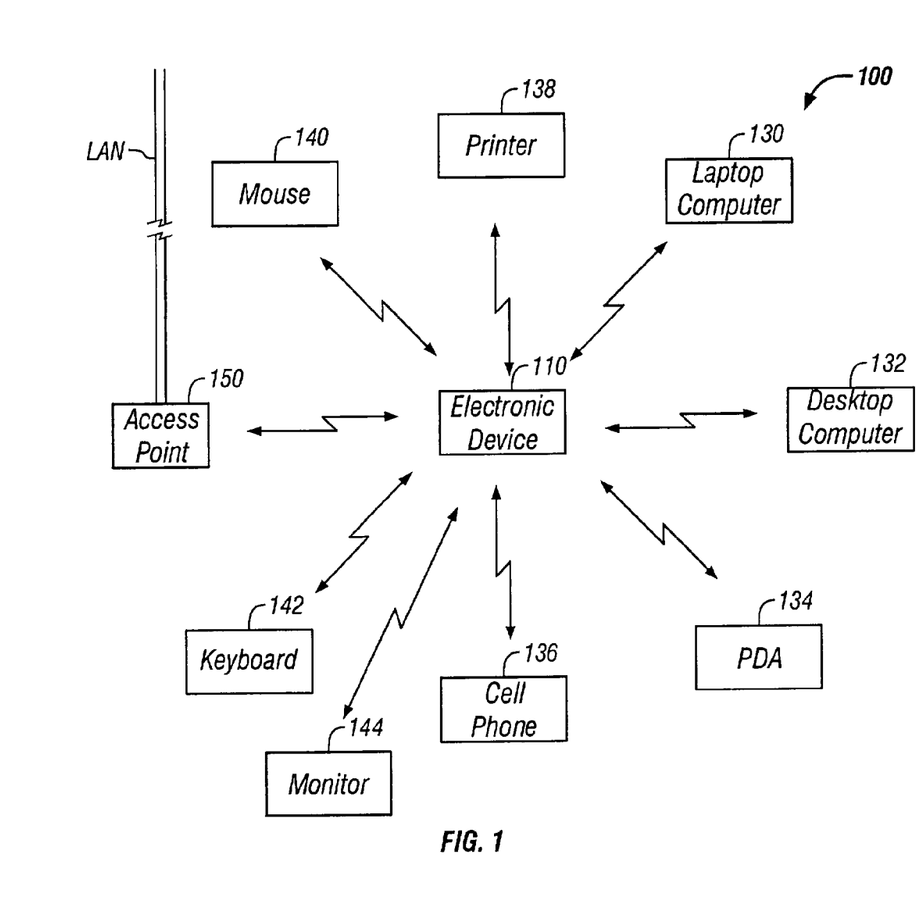
FIG. 1 is a schematic illustration of an example wireless communication system.

FIG. 1 is a schematic illustration of an example wireless communication system 100. In the wireless communication system 100, an electronic device 110 such as a portable computer may be in communication with other portable or fixed electronic devices such as, but not limited to, a laptop computer 130, a desktop computer 132, a personal digital assistant (PDA) 134, a cellular telephone 136, and a printer 138. Although in the illustrated example, the electronic device 110 is shown as a portable computer, persons of ordinary skill in the art will appreciate that the electronic device 110 may be, but is not limited to, a laptop computer, a notebook computer, a personal digital assistant (PDA), a cellular telephone, etc. As used herein "portable computer" refers to any computer (e.g., a laptop computer, a notebook computer) that is designed to be carried by a person. The electronic device 110 may also be in communication with a human interface device (HID) such as, but not limited to, a mouse 140, a keyboard 142, and a monitor 144. Further, the electronic device 110 may be in communication with an access point 150 operatively coupled to a local area network (LAN) to access, for example, the Internet, the Intranet, and other servers.

Figure 2:
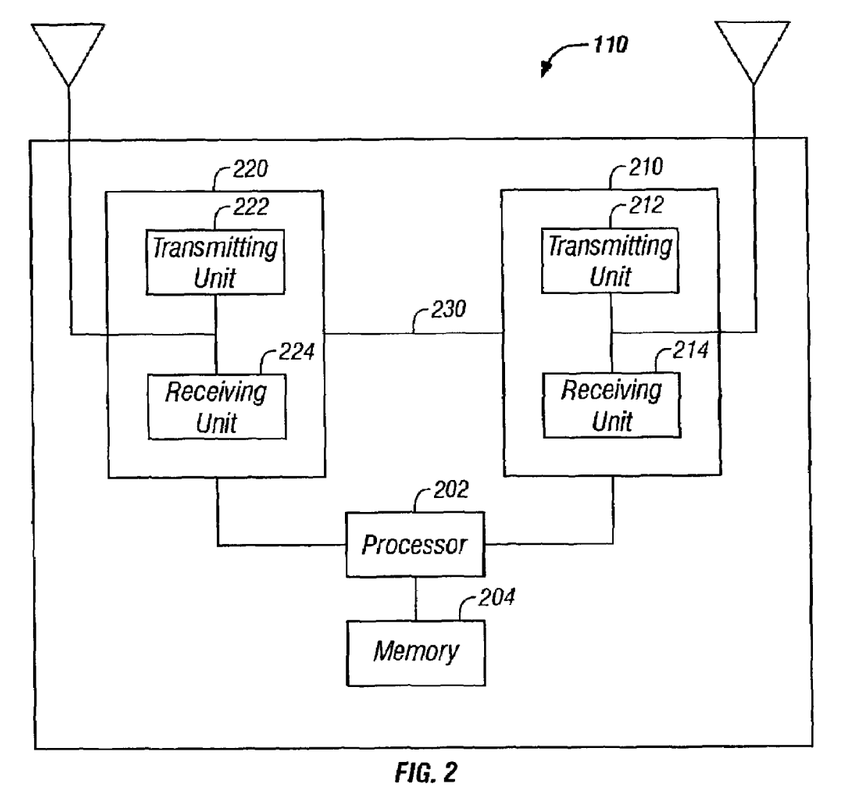
FIG. 2 is a more detailed view of the electronic device of FIG. 1.

As explained in detail below, the illustrated electronic device 110 generally includes a first transceiver system and a second transceiver system operable for wireless communication with other electronic devices or networks in a wireless personal access network (WPAN) and a wireless local area network (WLAN). One possible implementation of the electronic device 110 is shown in FIG. 2. As shown in that figure, the electronic device 110 generally includes a processor 202, a memory 204, a first transceiver system 210 and a second transceiver system 220. The processor 202 is operatively coupled to the memory 204, which stores a computer program as described in detail below or a set of operating instructions for the processor 202. Accordingly, the processor 202 executes the program or the set of operating instructions such that the electronic device 110 operates to provide the environments reflected in FIG. 1. The program or set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media.

The processor 202 is also operatively coupled to the first transceiver system 210 and the second transceiver system 220. The first transceiver system 210 may be operatively coupled to the second transceiver system 220 via a wired communication link 230. For example, the first transceiver system 210 may be in communication with the second transceiver system 220 via a communication bus. In another example, the first transceiver system 210 may be directly wired to the second transceiver system 220 (i.e., a hardwire link). Each of the first and second transceiver systems 210, 220 may include, but is not limited to, a transmitting unit generally shown as 212 and 222, and a receiving unit generally shown as 214 and 224. The transmitting unit 212 and the receiving unit 222 may be configured as multiple units as shown in FIG. 2 or be configured as a single (e.g., integral or unitary) unit.

As noted above, the first and second transceiver systems 210, 220 may provide wireless communication services to the electronic device 110. To illustrate the concept of communicating via a radio channel, the first transceiver system 210 may operate in accordance with a first wireless communication protocol, and the second transceiver system 220 may operate in accordance with a second wireless communication protocol. For example, the first wireless communication protocol may be, but is not limited to, the Institute of Electrical and Electronics Engineers (IEEE) 802.11b communication protocol (the IEEE standard 802.11b for "High Rate" Wireless Local Area Network), and the second wireless communication protocol may be, but is not limited to, the Bluetooth communication protocol. Accordingly, the first transceiver system 210 may operate in accordance with the IEEE 802.11b communication protocol (hereinafter "802.11b transceiver system"), and the second transceiver system 220 may operate in accordance with the Bluetooth communication protocol (hereinafter "Bluetooth transceiver system"). Both the 802.11b transceiver system 210 and the Bluetooth transceiver system 220 may be operable to communicate with other devices and/or network via radio channels. Persons of ordinary skill in the art will readily appreciate that the 802.11b transceiver system 210 and the Bluetooth transceiver system 220 may use well known direct sequence spread spectrum (DSSS) and frequency hopping spread spectrum (FHSS) algorithms, respectively, to select radio channels for communication.

A basic flow for scheduling communication via a radio channel that may be applied with the electronic device 110 shown in FIGS. 1 and 2 may start with the Bluetooth transceiver system 220 selecting a radio channel for communication (i.e., a selected radio channel). As used herein "communication" refers to any transmission and/or reception of a signal. For example, the selected radio channel may be used by the Bluetooth transceiver system 220 for transmitting a file to a desktop computer and/or receiving a command from a mouse. Persons of ordinary skill in the art will appreciate that selection of a radio channel may be implemented in many ways. For example, the Bluetooth transceiver system 220 may use a well known frequency hopping spread spectrum (FHSS) algorithm to select the radio channel for communication (e.g., an FHSS channel). The Bluetooth transceiver 220 may receive an 802.11b operating signal from the 802.11b transceiver system via the communication link 230. The 802.11b operating signal may include channel information indicative of the DSSS channel such as, but not limited to, a reference corresponding to a radio channel for communication associated with the 802.11b transceiver system 210 (e.g., a DSSS channel), an operating mode of the DSSS channel (e.g., active or inactive), and a priority level of communication associated with the 802.11b transceiver system 210 (e.g., low or high) via the DSSS channel. As used herein "DSSS channel" refers to any radio channel selected by the 802.11b transceiver system 210 to communicate with other electronic devices or networks in the wireless communication system 100 such as an access point (one shown as 150 in FIG. 1) or other 802.11b client via the ad hoc mode. Thus, the reference corresponding to the DSSS channel may be, but is not limited to, a letter, an alphanumeric character, and a number such as channel 1, channel 6, and channel 11 of any well known DSSS algorithm. The operating mode indicates whether the 802.11b transceiver system 210 is using and/or is intending to use the DSSS channel for communication. The priority level indicates whether the communication associated with the 802.11b transceiver system 210 via the DSSS channel has higher priority over the communication associated with the Bluetooth transceiver system 220 via the FHSS channel.

Figure 3:
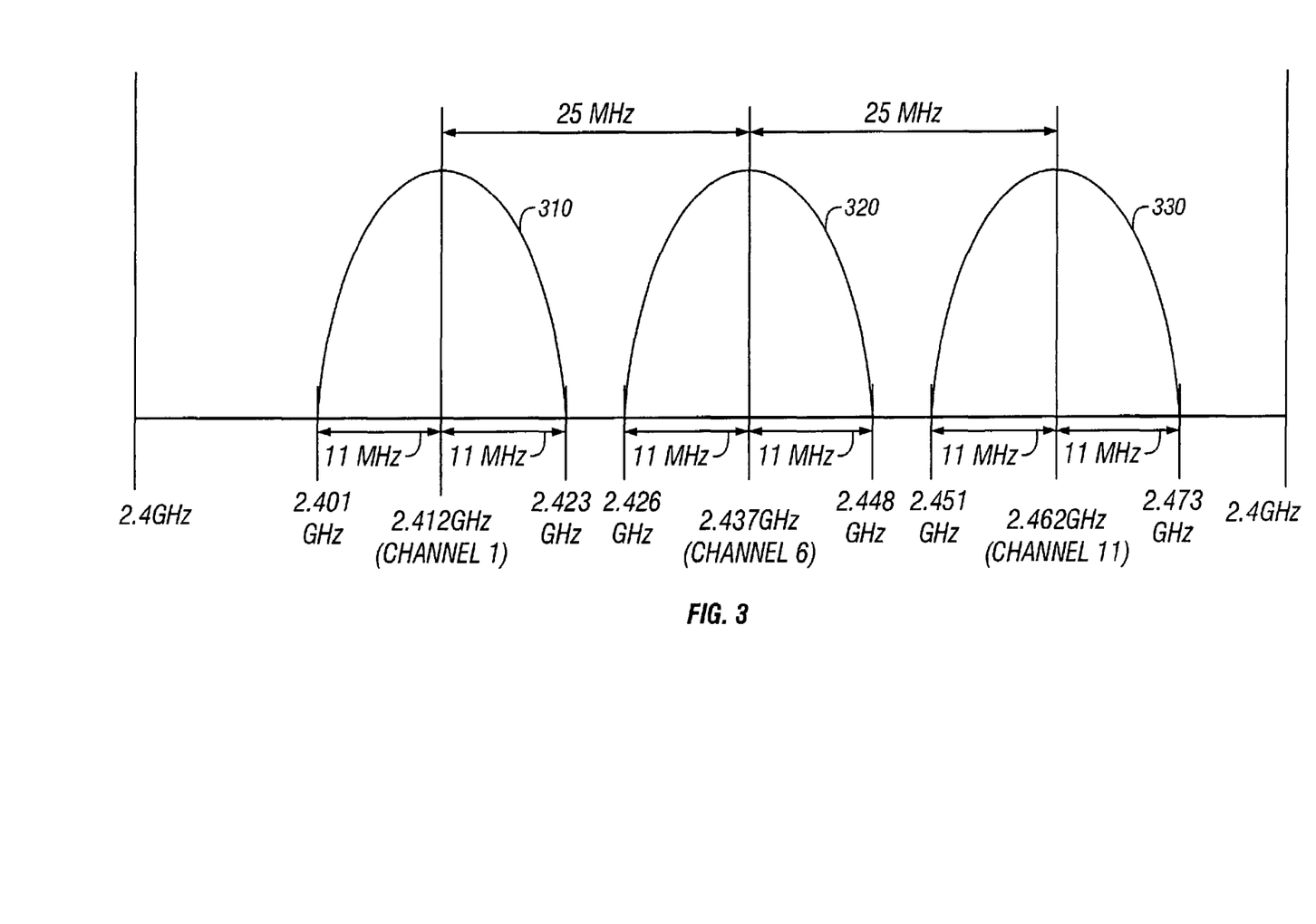
FIG. 3 is a schematic illustration of example direct sequence spread spectrum channels.

Based on the channel information provided by the 802.11b transceiver system 210, the electronic device 110 (e.g., via the Bluetooth transceiver system 220) determines whether the FHSS channel may be available for communication associated with the Bluetooth transceiver system 220 without causing radio interference between the FHSS channel and the DSSS channel. That is, the electronic device 110 determines whether the FHSS channel is in an interference zone of the DSSS channel (i.e., the frequency band of the FHSS channel is within, overlaps, adjacent to or substantially proximate to the frequency band of the DSSS channel) based on the reference corresponding to the DSSS channel. As noted above, persons of ordinary skill in the art will appreciate that the 802.11b transceiver system may use a DSSS algorithm to select the DSSS channel. Referring to FIG. 3, for example, the DSSS algorithm may provide the 802.11b transceiver system with three non-overlapping DSSS channels (i.e., channels, 1, 6, and 11) generally shown as 310, 320, and 330. The three non-overlapping channels are spaced 25 MHz apart in the 2.4 gigahertz (GHz) Industrial, Scientific, and Medical (ISM) frequency band (i.e., between 2.4 and 2.484 GHz). Each of the three non-overlapping channels has a bandwidth of 22 MHz. In particular, channel 1 at 2.412 GHz extends from 2.401 to 2.423 GHz (shown as 310), channel 6 at 2.437 GHz extends from 2.426 to 2.448 GHz (shown as 320), and channel 11 at 2.462 GHz extends from 2.451 to 2.473 GHz (shown as 330). Alternatively, the 802.11b transceiver system may be configured to operate any of the fourteen channels available for the 802.11b communication protocol.

Figure 4:
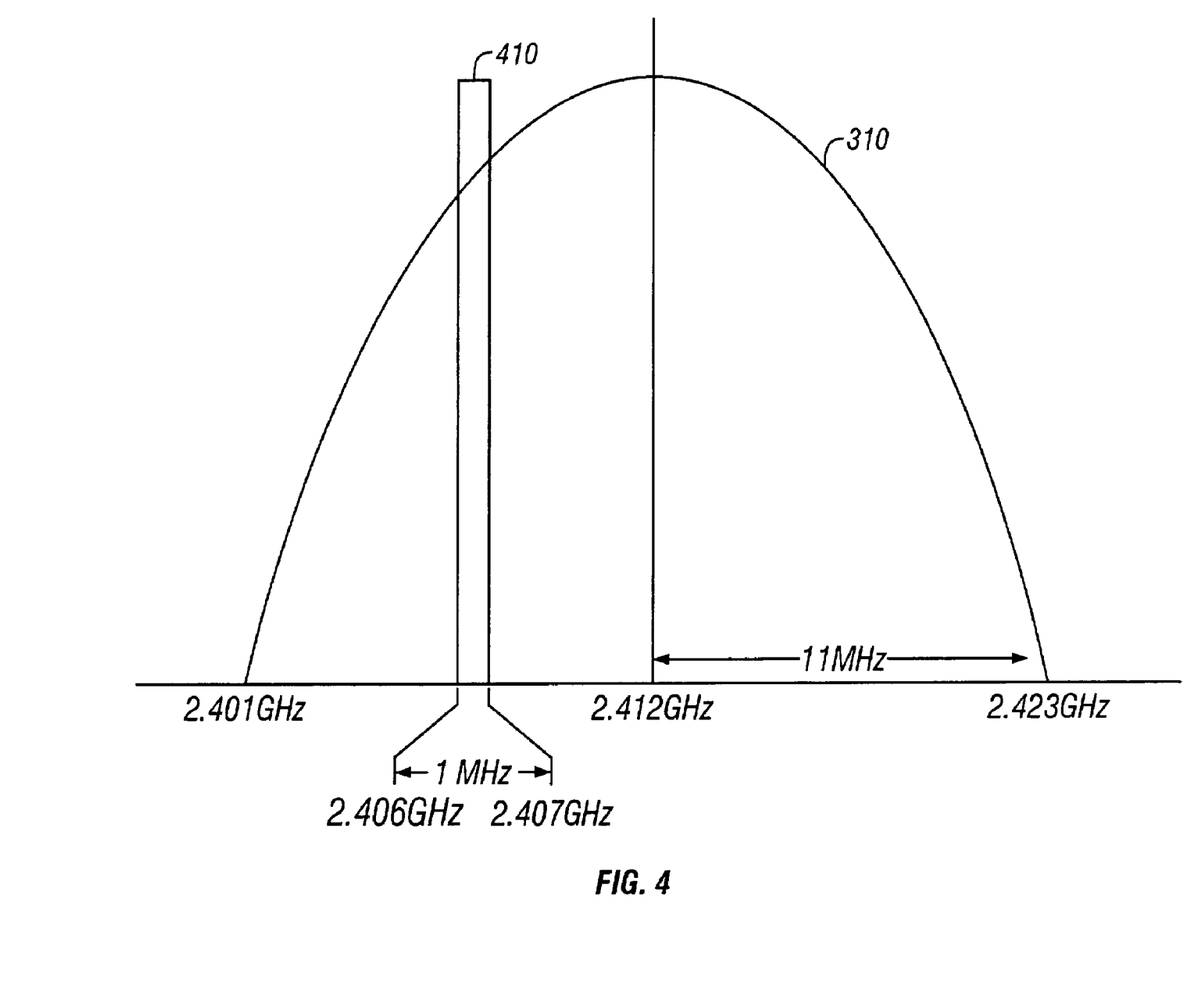
FIG. 4 is a schematic illustration of an example frequency hopping spread spectrum (FHSS) channel in an interference zone.
Figure 5:
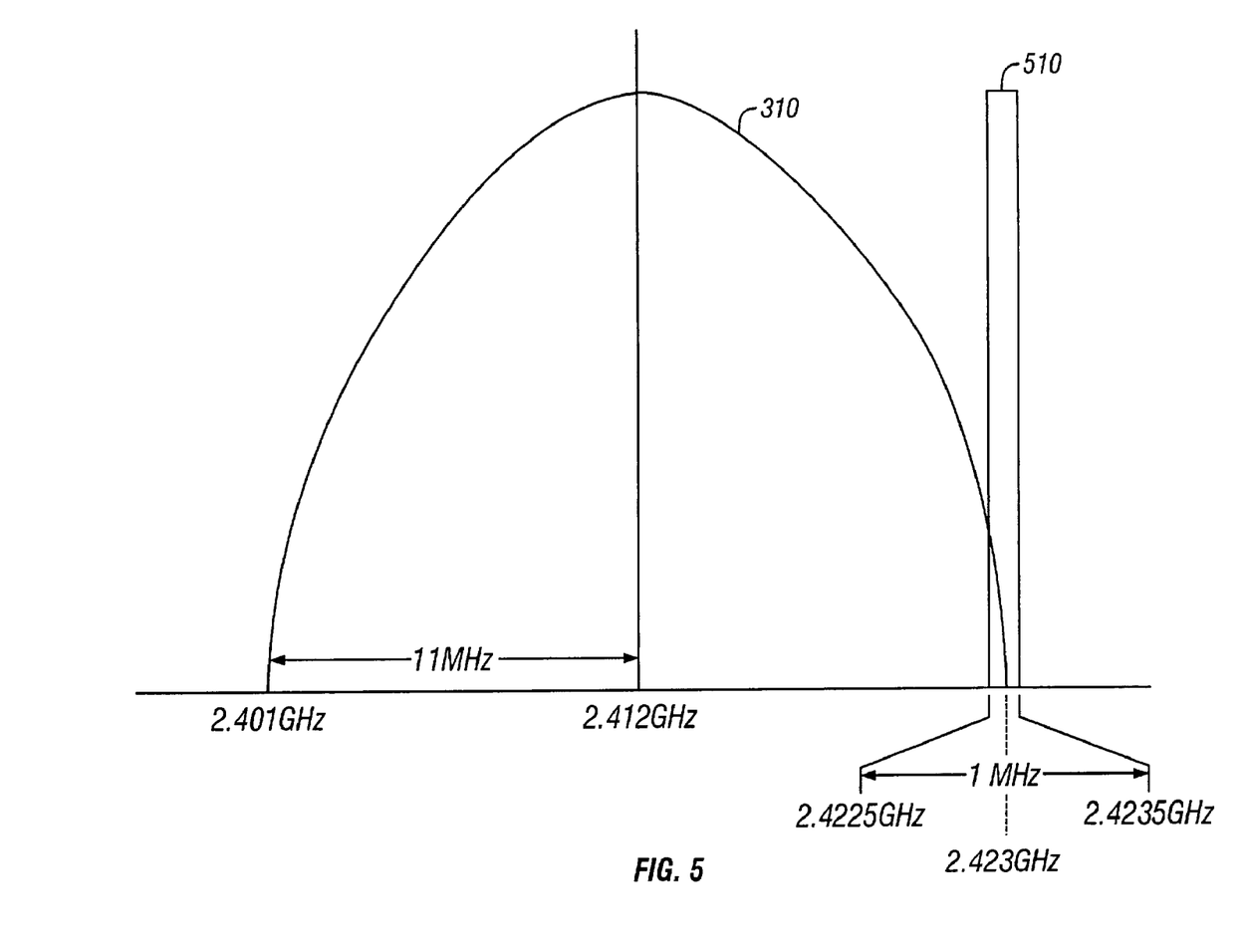
FIG. 5 is a schematic illustration of another example FHSS channel in the interference zone.
Figure 6:
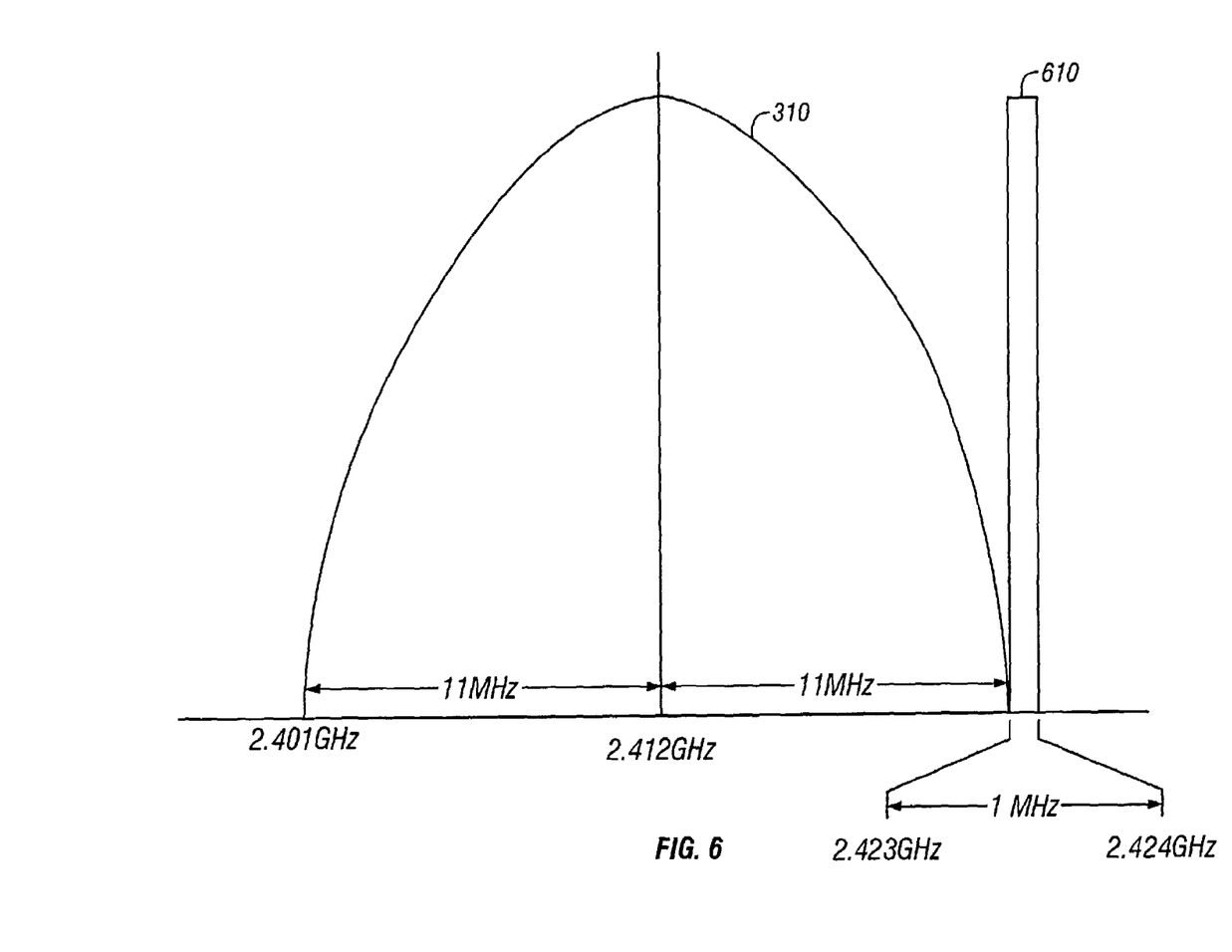
FIG. 6 is a schematic illustration of still another example FHSS channel in the interference zone.
Figure 7:
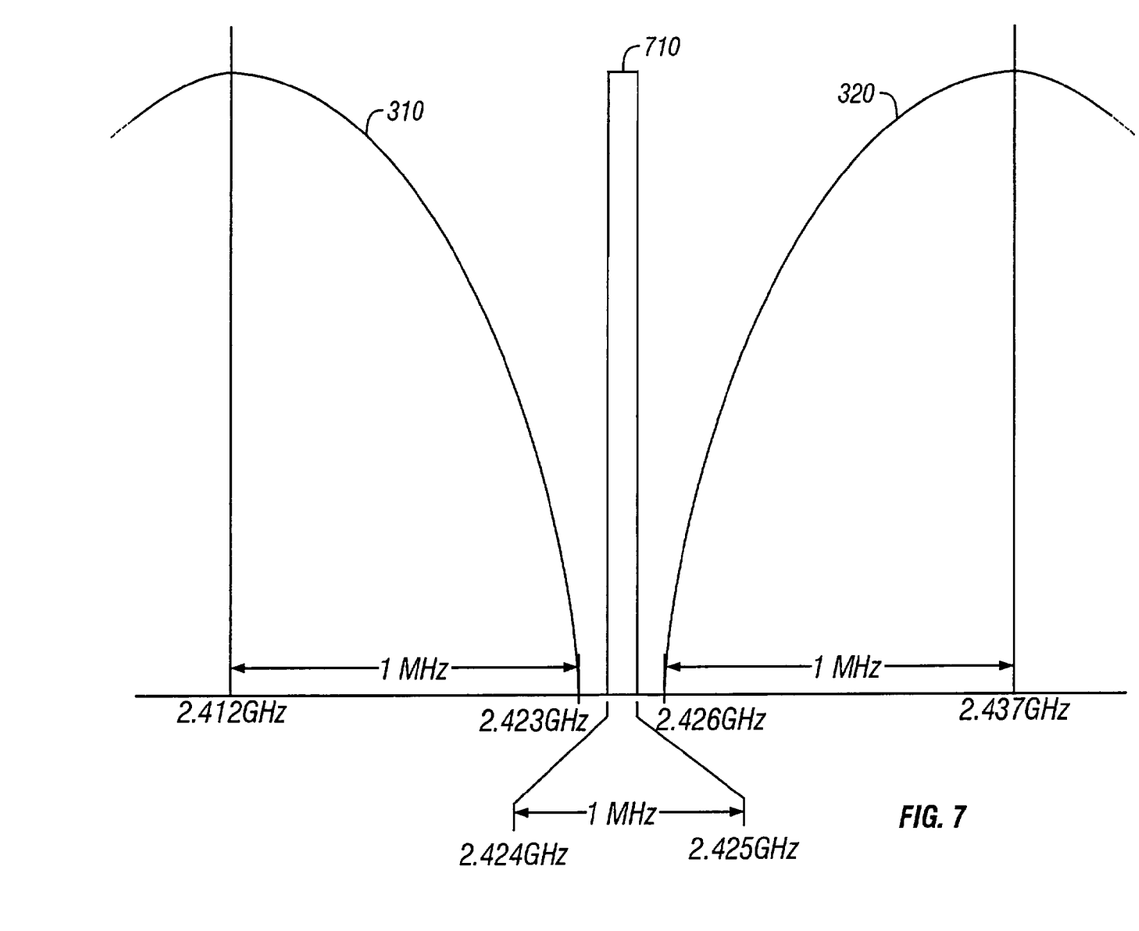
FIG. 7 is a schematic illustration of yet another example FHSS channel in the interference zone.

Persons of ordinary skill in the art will appreciate that the Bluetooth transceiver system may use FHSS algorithm to select the FHSS channel. In particular, the FHSS algorithm may provide the Bluetooth transceiver system with a radio channel having a bandwidth of 1 MHz in the 2.4 GHz ISM frequency band for communication. Thus, there may be radio interference between the 802.11b transceiver system and the Bluetooth transceiver system 220 because the FHSS channel may be in the interference zone of the DSSS channel. Referring to FIG. 4, for example, the FHSS channel 410 extending from 2.406 to 2.407 GHz is within the DSSS channel 310. As a result, the FHSS 410 may be in the interference zone of the DSSS channel 310. In another example, the FHSS channel 510 shown in FIG. 5 extends from 2.4225 to 2.4235 GHz. The FHSS channel 510 may be in the interference zone of the DSSS channel 310 because the FHSS channel 510 overlaps the DSSS channel 310 (i.e., from 2.4225 to 2.423 GHz). As shown in FIG. 6, the FHSS channel 610 extends from 2.423 to 2.424 GHz. Although, the FHSS channel 610 is adjacent to the DSSS channel 310, the FHSS channel 610 may still be in the interference zone of the DSSS 310 because marginal radio interference may exist with the FHSS 610 being on the edge of the DSSS channel 310. Further, marginal radio interference may exist with the FHSS channel 710 being substantially proximate to the DSSS channel 310 as shown in FIG. 7. As a result, the FHSS channel 710 may also be in the interference zone of the DSSS channel 310.

If the FHSS channel is not in the interference zone of the DSSS channel (e.g., the FHSS channel does not overlap the DSSS channel and the FHSS channel is not substantially proximate to the DSSS channel) then the Bluetooth transceiver system 220 may operate the FHSS channel to communicate with other electronic devices or networks in the wireless communication system 100 such as a PDA (one shown as 134 in FIG. 1). On the other hand, if the FHSS channel is in the interference zone of the DSSS channel as described above then the electronic device 110 may determine whether the DSSS channel is active for communication associated with the 802.11b transceiver system 210 based on the operation mode of the DSSS channel. For example, the electronic device 110 may determine whether the DSSS channel is active for communication associated with the 802.11b transceiver system 210 if the frequency band of the FHSS channel (shown as 410 in FIG. 4) is within the frequency band of the DSSS channel 310.

When the FHSS channel is in the interference zone, but the operation mode of the DSSS channel is inactive (i.e., the 802.11b transceiver system 210 is not using and/or is not intending to use the DSSS channel for communication), the Bluetooth transceiver system 220 may use the FHSS channel for communication. In contrast, when the operation mode of the DSSS channel is active (i.e., the 802.11b transceiver system 210 is using and/or is intending to use the DSSS channel for communication), the electronic device 110 may determine whether communication associated with the 802.11b transceiver system 210 has priority over communication associated with the Bluetooth transceiver system 220. When the communication associated with the 802.11b transceiver system 210 has higher priority than the communication associated with the Bluetooth transceiver system 220, the Bluetooth transceiver system 220 may suspend its communication via the FHSS channel. For example, the Bluetooth transceiver system 210 may entirely abort its communication via the FHSS channel or wait until the communication associated with the 802.11b transceiver system 210 via the DSSS channel is completed before using the FHSS channel to communicate with other devices or networks in the wireless communication system 100.

If the communication associated with the Bluetooth transceiver system 220 has higher priority than the communication associated with the 802.11b transceiver system 210 then the Bluetooth transceiver system 220 may transmit a Bluetooth operating signal to the 802.11b transceiver system 210. In particular, the Bluetooth operating signal may indicate that the communication associated with the Bluetooth transceiver system 220 has higher priority than the communication associated with the 802.11b transceiver system 210. In response to the Bluetooth operating signal, the 802.11b transceiver system 210 may suspend its communication via the DSSS channel to avoid interference with the communication associated with the Bluetooth transceiver system 220. That is, the 802.11b transceiver system 210 may entirely abort its communication via the DSSS channel or wait until the communication associated with the Bluetooth transceiver system 220 via the FHSS channel is completed to communicate via the DSSS channel again. As a result, radio interference between the 802.11b transceiver system 210 and the Bluetooth transceiver system 220 may be mitigated.

Figure 8:
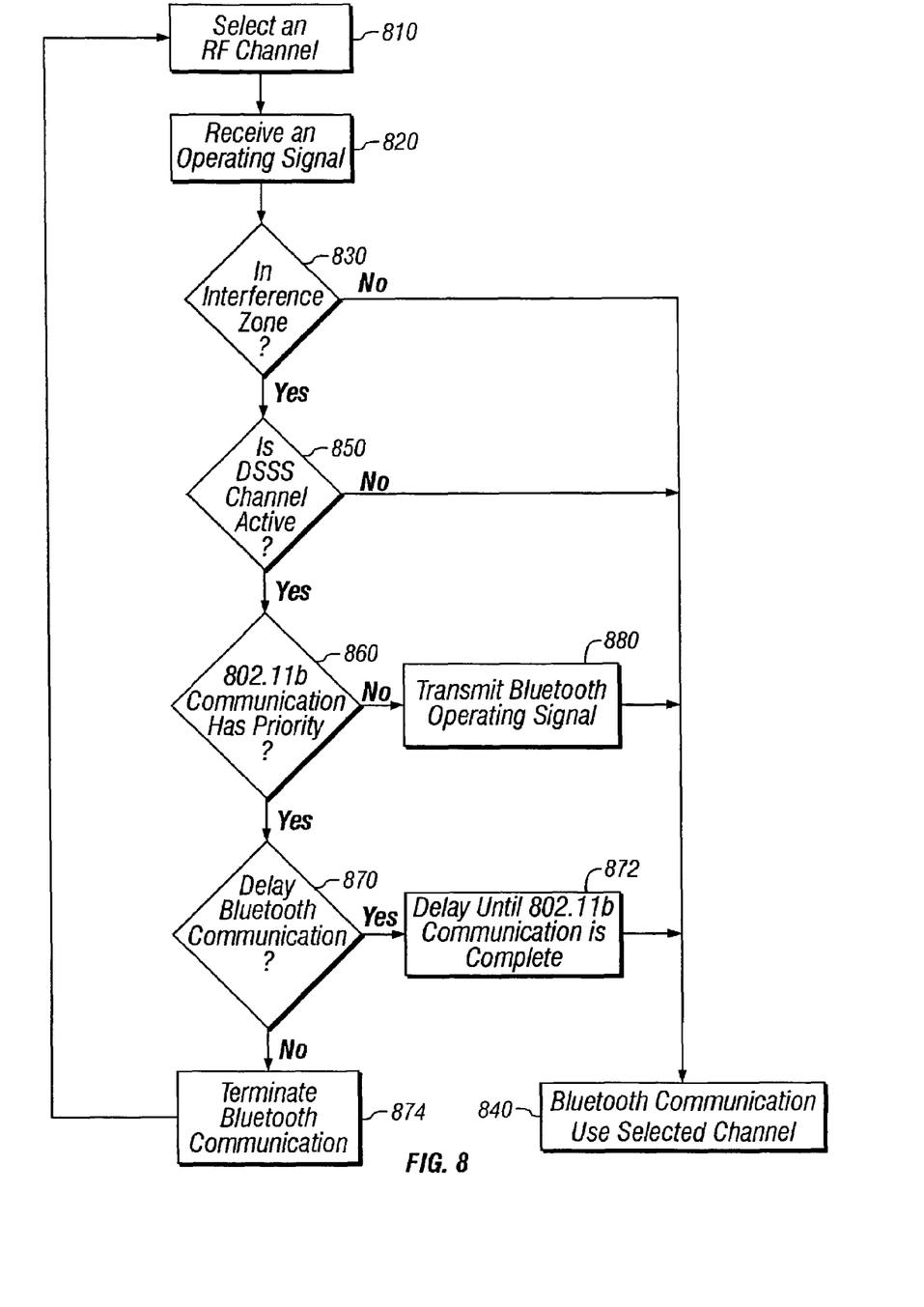
FIG. 8 is a flowchart illustrating the operation of the electronic device of FIG. 2.

One possible implementation of the computer program executed by the electronic device 110 to provide the environments reflected in FIG. 1 is illustrated in FIG. 8. Persons of ordinary skill in the art will appreciate that the computer program can be implemented in any of many different ways utilizing any of many different programming codes stored on any of many tangible mediums such as a volatile or non-volatile memory or other mass storage device (e.g., a floppy disk, a compact disc (CD), and a digital versatile disc (DVD)). Thus, although a particular order of steps is illustrated in FIG. 8, persons of ordinary skill in the art will appreciate that these steps can be performed in other temporal sequences. Again, the flow chart is merely provided as an example of one way to program the electronic device 110 to communicate via a radio channel to reduce interference between the first and second transceiver systems 210, 220 within the electronic device 110.

Assuming that the electronic device 110 includes an 802.11b transceiver system and a Bluetooth transceiver system as described above, the Bluetooth transceiver system uses a spread spectrum technique such as the FHSS algorithm to select a radio channel for communication, i.e., an FHSS channel (block 810 of FIG. 8). Persons of ordinary skill in the art will readily appreciate that the 802.11b transceiver system may use a well known direct sequence spread spectrum (DSSS) algorithm to select a radio channel for communication (i.e., a DSSS channel). At block 820, the Bluetooth transceiver system also receives an 802.11b operating signal from the 802.11b transceiver system via the wired communication link 230. The 802.11b operating signal includes channel information indicative of the DSSS channel such as, but not limited to, a reference corresponding to the DSSS channel that the 802.11b transceiver system is using and/or is intending to use for communication (e.g., a channel number), an operation mode of the DSSS channel (e.g., active or inactive), and a priority level of communication associated with the 802.11b transceiver system via the DSSS channel (e.g., low or high).

Upon selection of the FHSS channel for communication and reception of the 802.11b operating signal from the 802.11b transceiver system via the wired communication link 230, the electronic device 110 (e.g., via the Bluetooth transceiver system) determines whether the FHSS channel is available for communication associated with the Bluetooth transceiver system based on channel information indicative of the DSSS channel.

To determine whether the FHSS channel is available for communication, the electronic device 110 determines whether the FHSS channel is in an interference zone of the DSSS channel (block 830). Persons of ordinary skill in the art will appreciate that there are many ways for the electronic device 110 to determine whether the FHSS channel is in an interference zone of the DSSS channel as shown in FIGS. 4, 5, 6 and 7. For example, the electronic device 110 may use a look-up table to determine whether the FHSS channel is in the interference zone with the DSSS channel based on the channel number of the DSSS channel. In another example, the electronic device 110 may use hardware components such as, but not limited to, a comparator, to determine whether the bandwidth of FHSS channel is in the interference zone of the bandwidth of the DSSS channel.

Referring back to FIG. 8, when the FHSS channel is not in the interference zone of the DSSS channel, the Bluetooth transceiver system may use the FHSS channel to communicate with other electronic devices, human interface devices, access points, etc. within the wireless communication system 100 (block 840). If the FHSS channel is in the interference zone of the DSSS channel, control proceeds to block 850. At block 850, the electronic device 110 (e.g., via the Bluetooth transceiver system) determines whether the 802.11b transceiver system is using and/or is intending to use the DSSS channel for communication (e.g., transmission and/or reception of a signal by the 802.11b transceiver system) based on the operating mode of the DSSS channel. When the electronic device 110 detects that the DSSS channel is inactive (i.e., the 802.11b transceiver system is not using and/or is not intending to use the DSSS channel), the Bluetooth transceiver system may use the selected RF channel for communication as described above (block 840).

If the electronic device 110 detects that the DSSS channel is active (i.e., the 802.11b transceiver system is using and/or is intending to use the DSSS channel), control continues to block 860. At block 860, the electronic device 110 determines whether communication associated with the 802.11b transceiver system via the DSSS channel has higher priority than the communication associated with the Bluetooth transceiver system via the FHSS channel. For example, a high priority communication associated with the 802.11b transceiver system may be, but is not limited to, an acknowledgement of a reception of data packets, a CTS (clear-to-send) reception, and a beacon reception. When the electronic device 110 detects that the communication associated with 802.11b transceiver system via the DSSS channel has higher priority (block 860), the electronic device 110 may determine whether to suspend the communication associated with the Bluetooth transceiver system via the FHSS channel until the 802.11b communication is complete (block 870). For example, the Bluetooth transceiver system may wait and delay its communication via the FHSS channel (block 872). Alternatively, the Bluetooth transceiver system may entirely terminate its communication via the FHSS channel (block 874), and control returns to block 810 to select another radio channel for communication.

If the electronic device 110 detects that the communication associated with the Bluetooth transceiver system via the FHSS channel has higher priority than the communication associated with the 802.11b transceiver system via the DSSS channel, control proceeds to block 880. At block 880, the Bluetooth transceiver system may transmits a Bluetooth operating signal (i.e., a priority signal) to the 802.11b transceiver system, and control continues to block 840. The Bluetooth operating signal indicates that the communication associated with the Bluetooth transceiver system via the FHSS channel has priority over the communication associated with the 802.11b transceiver system via the DSSS channel. A high priority communication associated with the Bluetooth transceiver system may be, but is not limited to, device discovery, connection establishment, connection maintenance, and human interface device (HID) profile. In response to the Bluetooth operating signal, the 802.11b transceiver system may delay or entirely terminate its communication via the DSSS channel. As a result, radio interference between the Bluetooth transceiver system and the 802.11b transceiver system may be reduced by scheduling communication via the FHSS channel and the DSSS channel.

Although much of the above discussion has focused on reducing radio interference between a transceiver system operating in accordance with 802.11b communication protocol and a transceiver system operating in accordance with Bluetooth communication protocol, persons of ordinary skill in the art will appreciate that transceiver systems operating in accordance with other communication protocols may be used within a wireless communication system or an electronic device.

Although certain methods and apparatus have been described herein, the scope of coverage of this patent is not limited thereto. On the contrary, this patent covers all embodiments of the invention falling within the scope of the appended claims either literally or under the doctrine of equivalents.

What is claimed is:

1. In a wireless communication system, a method for communicating via a first radio channel, the method comprising:
    providing a wired communication link between a first transceiver system and a second transceiver system, the first transceiver system and the second transceiver system being in a same electronic device;
    providing channel information indicative of a second radio channel from the second transceiver system to the first transceiver system via the wired communication link; and
    communicating via the first radio channel with the first transceiver system if the channel information is indicative of a lack of radio interference between the first radio channel and the second radio channel.

2. A method as defined in claim 1 wherein providing the wired communication link between the first transceiver system and the second transceiver system comprises providing the wired communication link between the first transceiver system operating in accordance with Bluetooth™ communication protocol—version 1.1 and the second transceiver system operating in accordance with Institute of Electrical and Electronic Engineers (IEEE) 802.11b-1999 communication protocol.

3. A method as defined in claim 1 wherein the same electronic device comprises one of a laptop computer, a cellular telephone, and a personal digital assistant (PDA).

4. A method as defined in claim 1 wherein providing channel information indicative of a second radio channel from the second transceiver system to the first transceiver system via the wired communication link comprises providing channel information associated with one of a reference corresponding to the second radio channel, an operating mode of the second radio channel, and a priority level of communication associated with the second transceiver system via the second radio channel.

5. A method as defined in claim 1 wherein providing channel information indicative of the second radio channel from the second transceiver system to the first transceiver system via the wired communication link comprises providing one of a number, a letter, and an alphanumeric character corresponding to the second radio channel.

6. A method as defined in claim 1 wherein providing channel information indicative of the second radio channel from the second transceiver system to the first transceiver system via the wired communication link comprises providing channel information indicative of a direct sequence spread spectrum (DSSS) channel from the second transceiver system to the first transceiver system.

7. A method as defined in claim 1 wherein communicating via the first radio channel with the first transceiver system if the channel information is indicative of the lack of radio interference between the first radio channel and the second radio channel comprises communicating via a frequency hopping spread spectrum (FHSS) channel with the first transceiver system if the channel information is indicative of a lack of radio interference between the FHSS channel and a direct sequence spread spectrum (DSSS) channel.

8. A method as defined in claim 1 wherein communicating via the first radio channel with the first transceiver system if the channel information is indicative of the lack of radio interference between the first radio channel and the second radio channel comprises communicating via the first radio channel with the first transceiver system if the channel information is indicative of the first radio channel being absent from an interference zone of the second radio channel.

9. A method as defined in claim 1 wherein communicating via the first radio channel with the first transceiver system if the channel information is indicative of the lack of radio interference between the first radio channel and the second radio channel comprises communicating via the first radio channel with the first transceiver system if the channel information is indicative of the first radio channel being in an interference zone of the second radio channel and indicative of the second radio channel being inactive for communication associated with the second transceiver system.

10. A method as defined in claim 1 wherein communicating via the first radio channel with the first transceiver system if the channel information is indicative of the lack of radio interference between the first radio channel and the second radio channel comprises communicating via the first radio channel with the first transceiver system if the channel information is indicative of the first radio channel being in an interference zone of the second radio channel, indicative of the second radio channel being active for communication associated with the second transceiver system, and indicative of the communication associated with the second transceiver system via the second radio channel being higher priority than the communication associated with the first transceiver system via the first radio channel.

11. A method as defined in claim 10 further comprises:
    providing operating information indicative of the first transceiver system operating the first radio channel to the second transceiver system; and
    suspending communication associated with the second transceiver system via the second radio channel in response to the operating information.

12. A method as defined in claim 11 wherein providing operating information indicative of the first transceiver system operating the first radio channel to the second transceiver system comprises providing operating information indicative of the first transceiver system operating the first radio channel to the second transceiver system via the wired communication link in response to one of a device discovery, a connection establishment, a connection maintenance, and a human interface device (HID) profile.

13. An electronic device comprising:
    a wired communication link;
    a first transceiver system, the first transceiver system being operable to provide channel information indicative of a first radio channel; and
    a second transceiver system in communication with the first transceiver system via the wired communication link, the second transceiver system being responsive to the channel information to communicate via a second radio channel if the channel information is indicative of a lack of radio interference between the first radio channel and the second radio channel.

14. An electronic device as defined in claim 13 wherein the wired communication link comprises one of a hardwire link and a communication bus.

15. An electronic device as defined in claim 13 wherein the first transceiver system is a transceiver system operating in accordance with Institute of Electrical and Electronic Engineers (IEEE) 802.11b-1999 communication protocol, and the second transceiver system is a transceiver system operating in accordance with Bluetooth™ communication protocol version 1.1.

16. An electronic device as defined in claim 13 wherein the first radio channel is a direct sequence spread spectrum (DSSS) channel and the second radio channel is a frequency hopping spread spectrum (FHSS) channel.

17. An electronic device as defined in claim 13 wherein the channel information indicative of a first radio channel comprises information associated with one of a reference corresponding to the first radio channel, an operation mode of the first radio channel, and a priority level of communication associated with the first transceiver system via the first radio channel.

18. An electronic device as defined in claim 13 wherein the second transceiver system is operable to transmit a priority signal to the first transceiver system via the wired communication link in response to high priority communication associated with the second transceiver system.

19. An electronic device as defined in claim 18 wherein the first transceiver system is operable to suspend communication associated with the first transceiver system via the first radio channel in response to the priority signal from the second transceiver system.

20. An electronic device as defined in claim 18 wherein the high priority communication associated with the second transceiver system is one of a device discovery, a connection establishment, a connection maintenance, and a human interface device (HID) profile.

21. An electronic device as defined in claim 13 is one of a laptop computer, a cellular telephone, and a personal digital assistant (PDA).

22. In an electronic device including a first transceiver system and a second transceiver system, a processor operates in accordance with a computer program embodied on a computer-readable medium for a computer program for communicating via a first radio channel, the computer program comprising:
   a first set of operating instructions that directs the processor to provide channel information indicative of a second radio channel from the second transceiver system to the first transceiver system via a wired communication link operatively coupled to the first and second transceiver systems; and
   a second set of operating instructions that directs the processor to communicate via the first radio channel with the first transceiver system if the channel information is indicative of a lack of radio interference between the first radio channel and the second radio channel.

23. A computer program as defined in claim 22 wherein the electronic device comprises one of a laptop computer, a cellular telephone, and a personal digital assistant (PDA).

24. A computer program as defined in claim 22 wherein the first set of operating instructions comprises a routine that directs the processor to provide channel information indicative of a direct sequence spread spectrum (DSSS) channel from the first transceiver system operating in accordance with Institute of Electrical and Electronic Engineers (IEEE) 802.11b-1999 communication protocol to a transceiver system operating in accordance with Bluetooth[198] communication protocol via a wired communication link operatively coupled to the transceiver systems.

25. A computer program as defined in claim 22 wherein the first set of operating instructions comprises a routine that directs the processor to provide channel information associated with one of a reference corresponding to the second radio channel, an operating mode of the second radio channel, and a priority level of communication associated with the second transceiver system via the second radio channel.

26. A computer program as defined in claim 22 wherein the first set of operating instructions comprises a routine that directs the processor to provide providing channel information indicative of a direct sequence spread spectrum (DSSS) channel from the second transceiver system to the first transceiver system.

27. A computer program as defined in claim 22 wherein the second set of operating instructions comprises a routine that directs the processor to communicate via a frequency hopping spread spectrum (FHSS) channel with the first transceiver system if the channel information is indicative of the lack of radio interference between the FHSS channel and a direct sequence spread spectrum (DSSS) channel.

28. A computer program as defined in claim 22 wherein the second set of operating instructions comprises a routine that directs the processor to communicate via the first radio channel with the first transceiver system if the channel information is indicative of the first radio channel being absent from an interference zone of the second radio channel.

29. A computer program as defined in claim 22 wherein the second set of operating instructions comprises a routine that directs the processor to communicate via the first radio channel with the first transceiver system if the channel information is indicative of the first radio channel being in an interference zone of the second radio channel and indicative of the second radio channel being inactive for communication associated with the second transceiver system.

30. A computer program as defined in claim 22 wherein the second set of operating instructions comprises a routine that directs the processor to communicate via the first radio channel with the first transceiver system if the channel information is indicative of the first radio channel being in an interference zone of the second radio channel, indicative of the second radio channel being active for communication associated with the second transceiver system, and indicative of the communication associated with the second transceiver system via the second radio channel being higher priority than the communication associated with the first transceiver system via the first radio channel.

31. A computer program as defined in claim 22 wherein the second set of operating instructions further comprises:
   a routine that directs the processor to provide operating information indicative of the first transceiver system operating the first radio channel to the second transceiver system; and
   a routine that directs the processor to suspend communication associated with the second transceiver system via the second radio channel in response to the operating information.

* * * * *

UNITED STATES PATENT AND TRADEMARK OFFICE
CERTIFICATE OF CORRECTION

PATENT NO. : 7,194,283 B2
APPLICATION NO. : 10/218401
DATED : March 20, 2007
INVENTOR(S) : James P. Kardach et al.

It is certified that error appears in the above-identified patent and that said Letters Patent is hereby corrected as shown below:

In the Claims:

At Column 11, line 10, "protocol version" should be -- protocol – version --.

At Column 12, line 3, "Bluetooth$^{198}$" should be -- Bluetooth$^{TM}$ --.

At Column 12, line 4, "protocol via" should be -- protocol – version 1.1 via --.

At Column 12, line 5, "the transceiver" should be -- the first and second transceiver --.

Signed and Sealed this

Eighteenth Day of September, 2007

JON W. DUDAS
*Director of the United States Patent and Trademark Office*